(No Model.)

E. T. STARR.
SECONDARY BATTERY.

No. 267,804. Patented Nov. 21, 1882.

WITNESSES
Wm A. Skinkle
H. W. Elmore

INVENTOR
Eli T. Starr,
By his Attorneys
Baldwin, Hopkins & Peyton.

UNITED STATES PATENT OFFICE.

ELI T. STARR, OF PHILADELPHIA, PENNSYLVANIA.

SECONDARY BATTERY.

SPECIFICATION forming part of Letters Patent No. 267,804, dated November 21, 1882.

Application filed June 2, 1882. (No model.)

*To all whom it may concern:*

Be it known that I, ELI T. STARR, of the city and county of Philadelphia, in the State of Pennsylvania, have invented certain new and useful Improvements in Secondary Batteries or Electric Accumulators, of which the following is a specification.

My invention relates to the class of electric batteries which, when subjected to the action of an electric current passing through them, become charged or put into condition to give forth electric energy upon connecting their poles with a conductor.

Heretofore secondary batteries have been constructed so as to be "formed" or have the surface of their metallic plates rendered porous by repeated chargings and dischargings thereof. Such is the Planté type of battery. Secondary batteries have also been constructed with positive and negative electrodes or poles formed of pulverized carbon or porous material—such as finely-divided lead—separated by a porous plate or diaphragm. Such is the Percival type of battery. Secondary batteries have also been constructed with metallic plates or supports each coated with a layer of porous active material—such as oxide of lead. Such is the Faure type of battery.

The object of my invention is to improve the construction of secondary batteries or electric accumulators by forming one of its poles or electrodes of a plain sheet or sheets of metal—such as lead, as in Planté's battery—and the other electrode of a conglomerate or mass of porous active material—such as oxide of lead—contained within a porous envelope, covering, or casing. The lead plate (or plates) constitutes an efficient positive element when peroxidized upon its surface by the action of the charging current, while the mass or conglomerate of porous active material constitutes a most efficient negative electrode due to its largely-increased capacity (over a metal plate or plates of corresponding weight) of absorbing or collecting the hydrogen produced by the decomposition of the electrolytic fluid of the cell, it being a fact that in decomposing said fluid twice as much hydrogen in volume is given off as oxygen. By thus constructing a secondary battery comparative lightness and economy are attained, while the capacity of the battery as an accumulator of electric energy is increased—three very important and desirable ends to be attained in the construction and use of such batteries.

The subject-matter claimed herein is particularly pointed out at the close of the specification.

Figure 1:
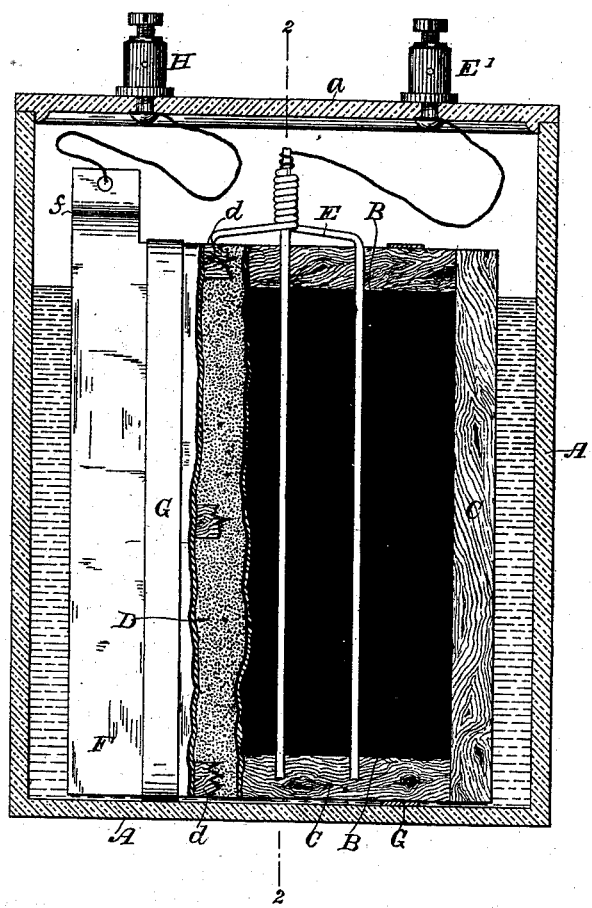
Figure 2:
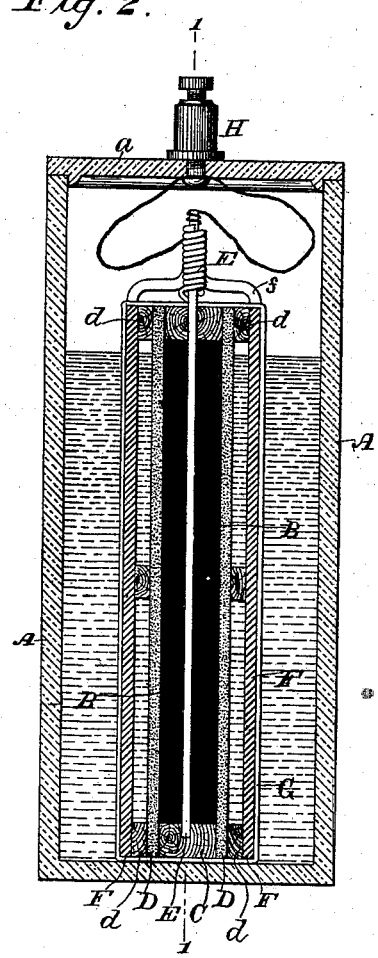

In the accompanying drawings, which illustrate my improvements as embodied in the best way now known to me, Figure 1 is a view in section of the improved battery, showing particularly the recess or chamber for containing the conglomerated active porous material constituting one electrode of the battery; and Fig. 2 is a section through the battery at right angles to that of Fig. 1, showing the porous plates or partitions at each side of the chamber which holds the porous active material or conglomerated mass constituting one of the electrodes of the battery, the view also showing the plain metal plates at the outside of the porous partitions separated from said partitions and connected together to constitute the other electrode of the battery.

The electrodes of the battery are immersed in acidulated water—for instance, in a vessel or jar, A, which may be of glass having a detachable cover, *a*. One of said electrodes consists of a mass or conglomerate of active porous material, B—such as oxide of lead (minium)—contained in a non-conducting frame, C, the sides of which are left open to be closed by porous plates or partitions D D, one at each side preferably. Said partitions may be of the material commonly used for the porous plates or partitions of galvanic batteries, but are preferably made of carbon. Wires E, of which there may be any desirable number, are embedded in the active porous mass B, so as to constitute a connection between said mass and a binding-post, E', upon the outside of the battery-vessel, said binding-post forming a ready means of connecting one terminal of the charging-line with the porous electrode, or of connecting one end of the wire which is to constitute the working-circuit of the battery. The other electrode of the battery I preferably make up of two plain metallic plates, F F, of lead, for instance, fitted to the flat broad sides of the porous electrode, said plates being separated from the porous plates D D by means of non-conducting strips $d$, and being formed in the manner of Planté elements—that is, they are rendered capable of being readily and highly charged by repeatedly charging and discharging the battery. The plates F F and the porous partitions D D are preferably held in place upon the porous electrode or its frame C by means of binding strips or bands G G—for instance, of cloth or india-rubber. At one corner of each of the metal plates F an extension, $f$, thereof is formed so as to afford a convenient method of connecting said plates together and to the binding-post H upon the outside of the battery-vessel, said plates constituting one electrode, and the porous mass B the other electrode, as before stated.

I have found a battery as thus constructed to be exceedingly effective in accumulating energy from a charging-current, while its construction enables it to be economically made and to be comparatively light in weight.

In my improved battery the porous electrode may be either the negative or positive pole of the battery. The battery works better, however, when the porous electrode is used as the negative element, as demonstration by actual practice has shown. The passage of an electric current through my improved battery strong enough to charge it produces decomposition in the cell and converts the positive electrode into the oxygen pole, and the negative electrode into the hydrogen pole, as usual in the operation of secondary batteries.

Various changes may be made in the structure of the battery without departing from my invention. For instance, but one metal plate to constitute one of the electrodes may be used instead of two or more, and it may be flat or bent so as to surround the porous electrode. In place of the porous plates D D, cloth or other material may be stretched across the open side or sides of the frame C. In place of the stiff frame C to inclose a flat mass of the porous active material, a mass of such material may be inclosed in a bag or covering of flannel, felt, or some such material, in which a wire (or wires) is embedded. Other obvious changes may be made. I prefer, however, the construction which I have particularly shown and described. If oxide of lead or minium is used as the porous active material, I prefer the conducting wire or wires E of that electrode to be of lead.

By a "plain" battery plate or plates in this specification I mean a plate or plates unprovided in the original construction of the battery with a layer of porous active material.

I disclaim herein, in favor of my application filed September 26, 1882, as a division of this case, the subject-matter specifically claimed in said application, reserving, however, as the subject-matter of this present application all other patentable subject-matter of my invention.

I claim as my invention—

The combination, in a secondary battery, of a positive electrode constructed of a metal plate or plates, a negative electrode constructed of a porous active conglomerate or mass, and a porous partition between said electrodes, substantially as described.

In testimony whereof I have hereunto subscribed my name.

ELI T. STARR.

Witnesses:
R. WALTER STARR,
SAMUEL E. STARR.